May 25, 1965  C. F. CALA  3,185,556
METHOD OF FORMING FUSED BIFOCAL LENS BLANKS
Filed April 24, 1961  3 Sheets-Sheet 1

INVENTOR.
CHARLES F. CALA
BY Frank C. Parker
ATTORNEY

May 25, 1965 C. F. CALA 3,185,556
METHOD OF FORMING FUSED BIFOCAL LENS BLANKS
Filed April 24, 1961 3 Sheets-Sheet 2

INVENTOR.
CHARLES F. CALA
BY Frank C. Parker
ATTORNEY

May 25, 1965

C. F. CALA 3,185,556

METHOD OF FORMING FUSED BIFOCAL LENS BLANKS

Filed April 24, 1961

*INVENTOR.*
CHARLES F. CALA

BY *Frank C. Parker*

ATTORNEY

United States Patent Office 3,185,556
Patented May 25, 1965

3,185,556
METHOD OF FORMING FUSED BIFOCAL LENS BLANKS
Charles F. Cala, Irondequoit, N.Y., assignor to Bausch & Lomb Incorporated, Rochester, N.Y., a corporation of New York
Filed Apr. 24, 1961, Ser. No. 105,095
1 Claim. (Cl. 65—39)

The present invention relates to a method of forming and fusing the minor element of a lens to the major element of a lens by depositing molten glass of an appropriate composition upon a countersink surface in the major element without the entrapment of air or foreign particles at the fusion interfaces and without the consequent partial destruction of the curvature of the fusion interfaces.

It has been proposed heretofore to form bifocal lens blanks by the deposition of a suitable molten segment glass onto the countersink surface of the major lens blank, however, such prior methods have not been completely satisfactory for the principal reasons that either air becomes entrapped between the fused interfaces or foreign particles comprising dirt, dust, and glass particles, formed at the time the molten segment glass is sheared from the supply thereof, become embedded between the interfaces. These foreign particles are particularly undesirable as the molten glass tends to bridge over the particle and form a defect of substantially greater dimension than the dimension of the particle itself. In many instances, the foreign particles itself could probably not be seen or would be unobjectionable to a person wearing spectacles made with the lenses involved but the enlargement of the defect caused by the bridging over of the foreign particle by the molten segment glass makes the defect sufficiently noticeable so that the lens is no longer satisfactory.

In order to minimize the problems involved as a result of the dirt and glass particles becoming lodged between the interfaces of a fused bifocal blank, it has been proposed to heat the major blank while it is disposed in a position with the countersink surface thereof either facing horizontally or slightly downwardly. This substantially decreases the tendency for the accumulation of dirt on the countersink surface during the initial heating of the major blank which is necessary in order for proper fusion of the segment glass therewith. Thereafter, the prior methods have included a step wherein the major blank is turned over with its countersink surface facing generally upwardly so that a glob or gob of molten segment glass may be dropped onto the countersink surface. The molten gob is then either allowed to flow freely over the entire countersink surface or it may be pressed to cause the same to flow across the countersink surface. These methods, while lessening the tendency for dirt and other foreign particles to accumulate on the countersink surface before the gob of molten segment glass is applied thereto, do not completely overcome the problem as there is still the possibility for dirt and foreign matter to settle upon the countersink surface after the major blank is turned over preparatory to the dropping of the gob of molten segment glass thereon.

The present invention comprises a method of forming fused bifocal lens blanks wherein the major blanks are heated, preparatory to the fusion step, while disposed with the countersink surface thereof facing either substantially horizontally or slightly downwardly in order to lessen the possibility of dirt or other foreign matter collecting on the countersink surface.

Thereafter, the major blank is moved into a position with its countersink surface disposed generally vertically, that is, with the countersink surface in a generally horizontal or slightly downwardly facing direction and with the countersink surface adjacent to a ribbon of molten segment glass. While the countersink surface is disposed in this generally horizontal or slightly downwardly facing direction, the ribbon of molten segment glass is moved into engagement with the countersink surface and thereafter sheared. Consequently, the possibility of foreign material collecting on the countersink surface during and immediately prior to the actual fusing operation is minimized, and since the ribbon of molten segment glass is not sheared until after the actual fusion, the chances for fine glass slivers, or foreign particles lodging on the interface between the segment and the countersink surface is substantially eliminated.

The method comprising the subject matter of the present invention will be more readily understood from the following detailed description, when read in conjunction with the accompanying drawings, wherein.

Figure 1:
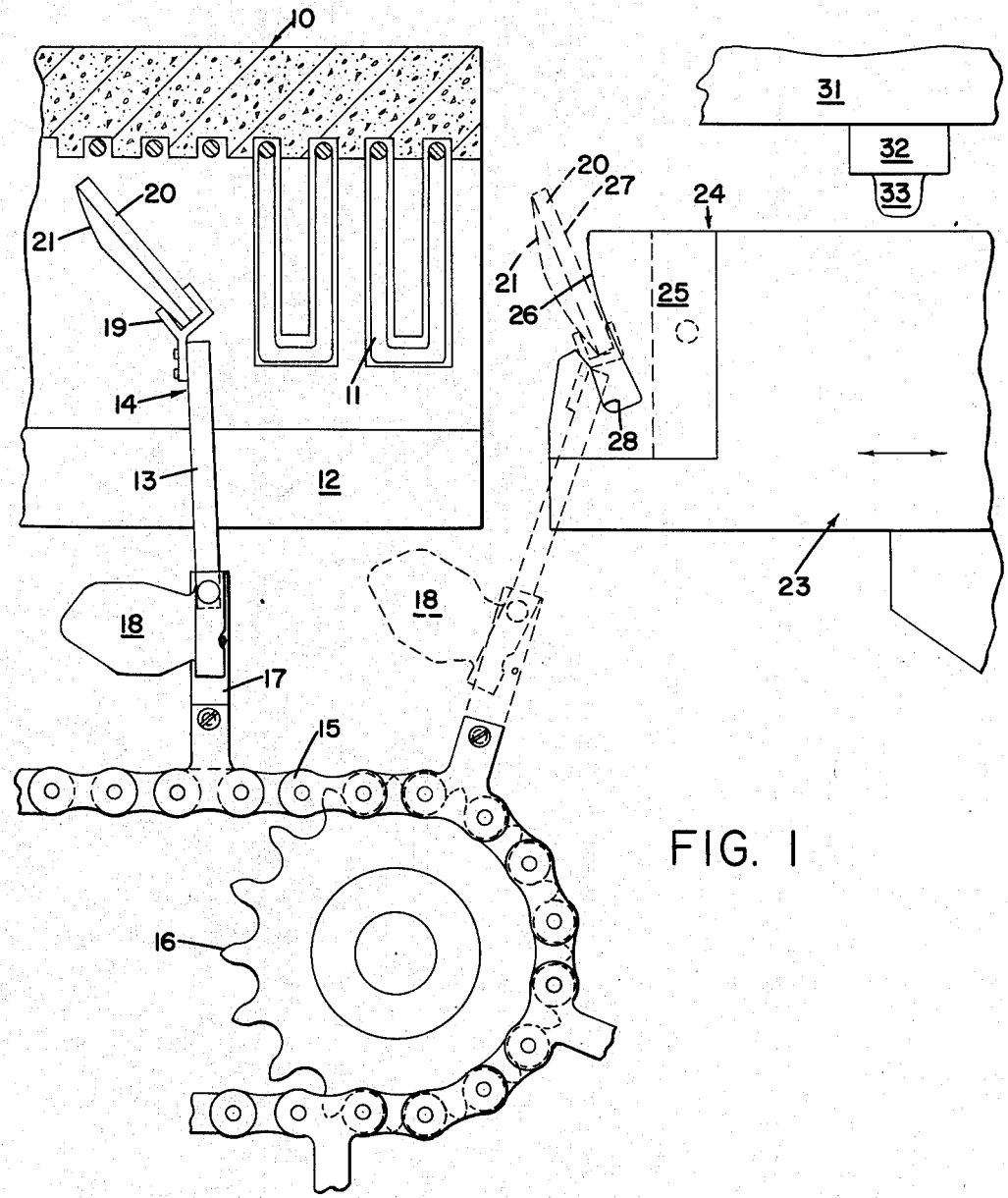
FIG. 1 represents a schematic illustration showing the heater or furnace in which the major blanks are heated preparatory to the fusing operation and also showing one of the major blanks being deposited in a suitable holder prior to the deposition of the molten segment glass thereon.

Referring now to the drawings, the method comprising the subject matter of the present invention will now be described in detail.

The heating chamber or furnace is represented by reference numeral 10 and is formed with suitable heating coils 11 disposed along each side thereof. The furnace 10 is of conventional construction and is elongated and formed with an opening or slot 12 at the bottom thereof for facilitating the reception of arms 13 of lens holders 14.

The lens holders 14 are respectively carried at spaced intervals on a roller chain 15 which extends around a suitable sprocket 16. The arms 13 of holders 14 are pivotally linked to connectors 17 formed on links of chain 15 and are each formed with weights 18 thereon. Each holder 14 is also provided with suitable fingers 19 for holding a major lens blank 20 in a position within furnace 10 so that the countersink surface 21 on the major blank 20 is disposed in a position preferably facing slightly downwardly. However, it will be understood that so long as the countersink surface 21 faces horizontally or downwardly there is still a minimum tendency for the accumulation of dirt or foreign particles on the countersink surface during passage of the major blank through the furnace 10.

Disposed at the end of furnace 10 is a rotary lens blank holder 23. The lens blank holder 23 is formed with a plurality of stations 24, each station 24 comprising a ceramic or other heat resistant lens mounting member 25. The lens mounting members 25 are preferably removable from the holder 23 as it is contemplated that the lens mounting members 25 will be sized in order to appropriately handle corresponding sizes of lens blanks 20. Each lens holder 25 is formed with a convex surface 26 which is substantially complementary at least in the upper portion thereof to the concave surface 27 of the major blank 20. The surface 26 extends downwardly and terminates at the bottom of a slot 28 which retains the lens 20 in position in the holder 25. It is contemplated that when a lens 20 is properly positioned in the lens holder 25, it will be relatively snugly received within the slot 28.

The lower portion of each lens holder 25 and the mounting member 23 are formed with a suitable slot 29 for the reception of a pusher rod 30 in order to facilitate removal of the lenses 20 from the slots 28 after completion of the fusing operation.

Figure 2:
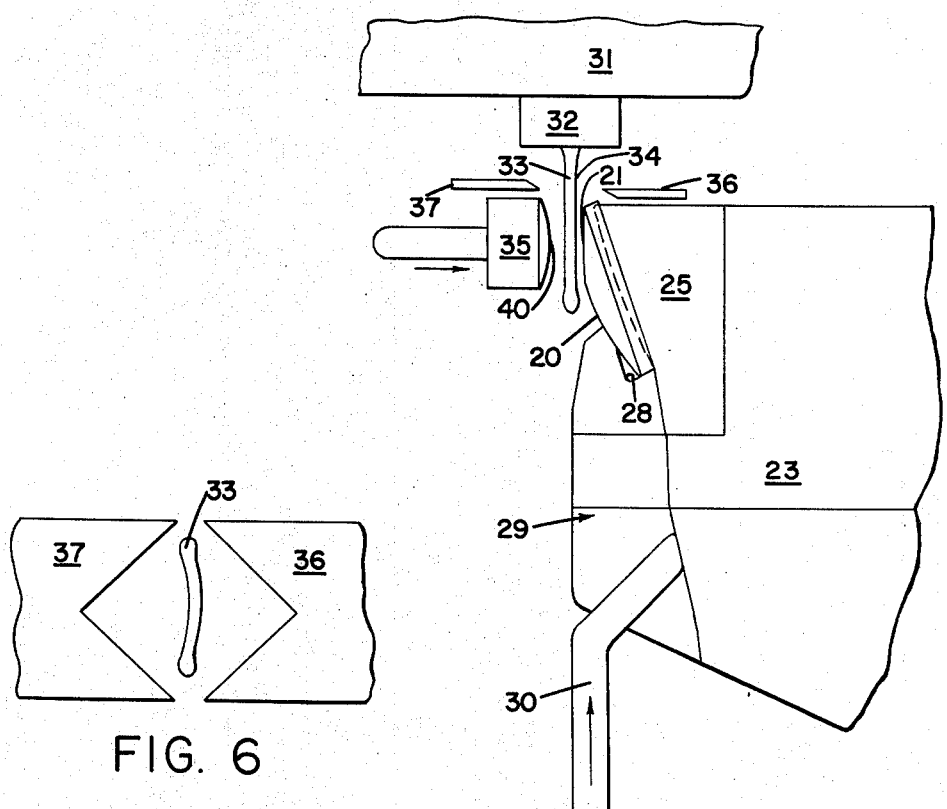
FIG. 2 is a schematic view showing the major blank disposed within the holder and moved into alignment with the ribbon of molten segment glass.
Figure 6:
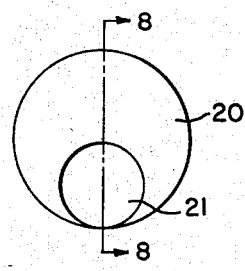
FIG. 6 shows fragmentarily a cross-sectional view of the ribbon of molten segment glass with the shears disposed in their normal disengaged position with respect to the ribbon.
Figures 7, 8:
FIG. 7 is a plan view of a major lens blank with a countersink surface formed thereon.
FIG. 8 is a sectional view of a major lens blank taken substantially along the line 8—8 in FIG. 7.
Figure 3:
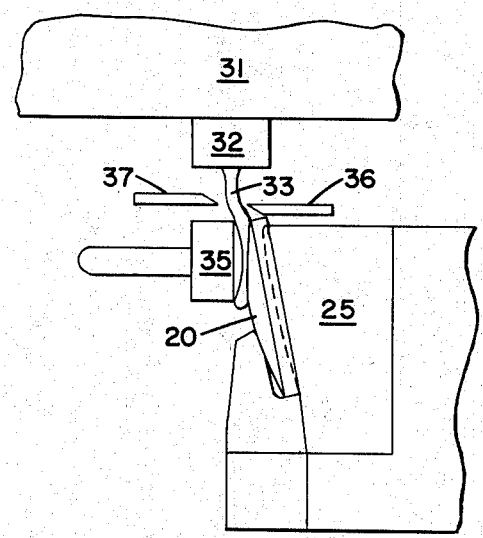
FIG. 3 is a schematic view showing the ribbon of molten segment glass just as it is pressed against the countersink surface of the major blank.
Figure 4:
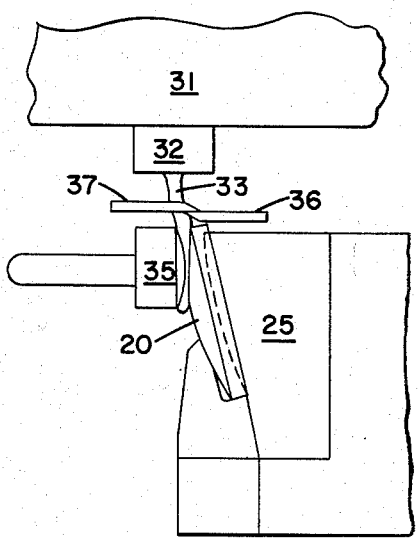
FIG. 4 is a schematic view showing the step of shearing the molten segment glass from the descending stream or ribbon thereof.
Figure 5:
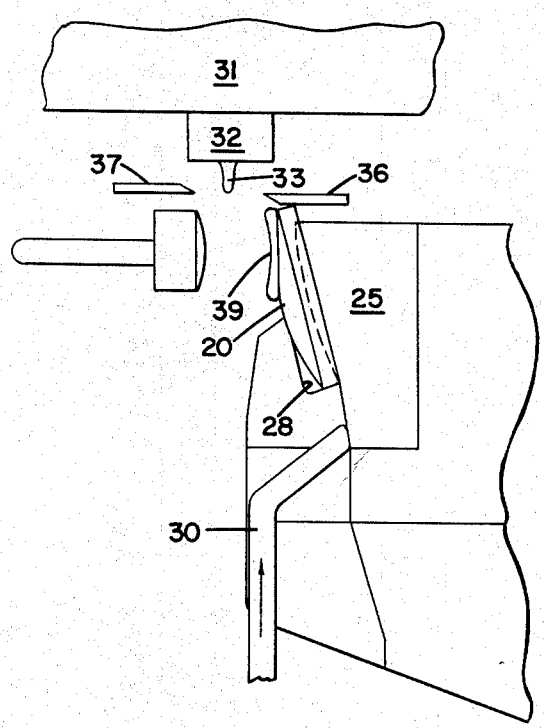
FIG. 5 is a schematic view showing the major blank with the segment fused thereto and with the shears and pressing member in condition for the next fusing operation.

Disposed above the lens mounting member 23 is a suitable melting furnace 31 for preparing the molten segment glass. The molten segment glass melting furnace 31 comprises a discharge opening 32 which is elongated slightly and which is of a shape substantially like the shape of the molten ribbon of segment glass 33 shown in FIG. 6. Preferably the ribbon of molten glass 33 is slightly curved in cross-section, or concavo-convex shaped, as shown in FIG. 6. The position of the discharge opening 32 is directly above the station represented in FIGS. 2, 3, 4 and 5 and is disposed so that the convex side 34 of ribbon 33 is substantially parallel to countersink surface 21 on the major blank 20 disposed in slot 28. The countersink surface 21 is a curved concave surface, as shown in FIGS. 7 and 8, and when the major blank 20 is disposed in the slot 28, the countersink surface 21 lies in a generally vertical direction adjacent the ribbon 33, that is, the countersink surface 21 faces approximately or generally horizontally or slightly downwardly. After suitable rotation of the lens mounting member 23 to bring one of the lens holders 25 with a lens 20 positioned therein into position adjacent the ribbon of molten segment glass 33, the lens mounting member 23 remains stationary for an interval of time. After a sufficient quantity of molten segment glass flows through opening 32 to substantially cover the countersink surface 21, a plunger 35 is moved to the right from the position shown in FIG. 2 to the position shown in FIGS. 3 and 4, in order to move the ribbon of segment glass 33 into contact with the countersink surface 21 of the major blank 20. Thereafter, a pair of shears 36 and 37 are moved together in conventional fashion to sever the portion of segment glass disposed in contact with the countersink surface 21 from the stream thereof which is continually flowing from discharge opening 32. After the segment glass is thus sheared from the stream 33, the lens mounting member 23 is rotated to bring the next major blank 20 into position opposite the ribbon 33 of molten segment glass. At one of the subsequent stations the pusher rod 30 is moved upwardly in order to push the lens 20 with the segment 39 thereon out of the slot 28.

It should be noted that the leading surface 40 of plunger 35 has a slightly sharper curvature than the curvature of the countersink surface 21. By forming the surface 40 of the plunger 35 with this relatively sharper curvature, the plunger 35 causes the segment glass 39 to first strike the substantial center of the countersink surface 21 and upon the remaining movement of the plunger toward the countersink, the remainder of the segment progressively contacts the countersink surface proceeding radially outwardly from the initial point of contact of the segment 39 with the countersink surface 21.

It should also be pointed out that it is particularly desirable to have the stream of molten segment glass 33 quite thin as it is then possible to have the stream hotter than would otherwise be possible. The hotter the stream of molten segment glass, the easier it is for the stream to follow the curvature of the leading side of the plunger 35.

Also, the hotter the stream of segment glass, the more quickly it fuses with the major blank. With the stream being thin it can cool quicker and does not subject the countersink surface to sufficient heat for a long enough time to destroy the curvature of the finely ground and polished countersink surface. Another advantage of the flat ribbon of segment glass, also stemming from the fact that it can be maintained at a higher temperature than would be the case if it were thicker, is that during the severing operation the glass is more fluid and there is less crushed glass during the severing operation to cause fine particles which might tend to lodge on the countersink surfaces and cause unacceptable finished blanks. A further advantage of utilizing as hot a ribbon of segment glass as possible is that the segment glass being hotter, if there are foreign particles on the countersink surface, the more fluid segment glass is better able to envelop them and thereby the enlargement of the defects caused by a bridging of foreign particles is minimized. Finally, with a more fluid thin stream it requires less segment glass to cover the countersink surface.

It has been found, as stated heretofore, that so long as the countersink surface 21 faces substantially horizontally or slightly downwardly throughout the entire heating and deposition of the major blank 20 and deposition of the segment glass thereon, the possibility of foreign particles getting onto the countersink surface and causing defects in the finished lenses is minimized. Therefore, it is understood to be within the realm of the present invention to have the countersink surface 21 facing either substantially horizontally or slightly downwardly during the heating operation by the furnace 10 and during the actual operation where the ribbon of molten segment glass 33 is moved into contact with the countersink surface 21.

It is contemplated that changes and modifications may be made in the present invention without departing from the spirit or scope thereof.

What is claimed is:

The method of making multifocal lens blanks by depositing molten segment glass upon a countersink surface of a preheated countersink blank comprising the steps including mounting the preheated countersink blank with the countersink surface disposed in a generally vertical direction facing substantially horizontally, establishing a downwardly flowing substantially flat vertical ribbon of molten segment glass substantially parallel to the countersink surface, moving a convex plunger of somewhat greater curvature than that of the countersink surface against the ribbon of molten segment glass with the leading area of the plunger being opposite the approximate center of the countersink surface so as to cause the ribbon to first contact the approximate center of the countersink surface and thereafter progressively contact the remainder of the countersink surface proceeding radially outwardly from such center whereby to eliminate the entrapment of air between the molten glass and the countersink surface, and thereafter severing the ribbon of molten segment glass at a point above the portion thereof in contact with the countersink surface.

References Cited by the Examiner

UNITED STATES PATENTS

| 793,685 | 7/05 | Schnelbach | 65—46 |
| 2,433,013 | 12/47 | Ziegler | 65—146 |
| 2,734,315 | 2/56 | Poundstone | 65—39 |
| 2,881,563 | 4/59 | Upton | 65—152 |
| 2,958,162 | 11/60 | Upton | 65—30 |
| 3,130,029 | 4/64 | Cala | 65—39 |

DONALL H. SYLVESTER, *Primary Examiner.*

IVAN R. LADY, *Examiner.*